(12) United States Patent
Akhter et al.

(10) Patent No.: US 10,977,359 B2
(45) Date of Patent: Apr. 13, 2021

(54) AUTOMATIC TAKEOVER OF APPLICATIONS INSTALLED ON CLIENT DEVICES IN AN ENTERPRISE NETWORK

(71) Applicant: Microsoft Technology Licensing, LLC, Redmond, WA (US)

(72) Inventors: Saeed Javed Akhter, Redmond, WA (US); Krassimir Emilov Karamfilov, Redmond, WA (US); Yavor Vesselinov Angelov, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 395 days.

(21) Appl. No.: 15/638,425

(22) Filed: Jun. 30, 2017

(65) Prior Publication Data
US 2018/0330431 A1 Nov. 15, 2018

Related U.S. Application Data (60) Provisional application No. 62/506,208, filed on May 15, 2017.

(51) Int. Cl.
*G06F 21/41* (2013.01)
*G06Q 30/06* (2012.01)
(Continued)

(52) U.S. Cl.
CPC ............. *G06F 21/41* (2013.01); *G06F 21/10* (2013.01); *G06Q 10/00* (2013.01);
(Continued)

(58) Field of Classification Search
CPC .......... G06F 21/41; G06F 21/45; G06F 21/62; G06Q 10/00; H04L 2463/082; H04L 67/306; H04W 12/0027
See application file for complete search history.

(56) References Cited

U.S. PATENT DOCUMENTS 8,584,026 B2 * 11/2013 Lynk ................... G06F 3/04815
715/757
8,606,667 B2 12/2013 Ferris et al.
(Continued)

FOREIGN PATENT DOCUMENTS

WO 2013142021 A1 9/2013
WO WO-2013142021 A1 * 9/2013 ......... G06F 21/6218

OTHER PUBLICATIONS

"CASSO Capabilities-CA Single Sign-On-12.7—CA Technologies Documentation", Retrieved from <<https://docops.ca.com/ca-single-sign-on/12-7/en/getting-started/ca-sso-capabilities>>, Mar. 16, 2017, 2 Pages.
(Continued)

*Primary Examiner* — Mamon Obeid
*Assistant Examiner* — Jahed Ali
(74) *Attorney, Agent, or Firm* — Workman Nydegger (57) ABSTRACT

A system includes a processor and machine readable instructions stored on a tangible machine readable medium and executable by the processor, for a computer program, configured to allow one or more accounts of an enterprise to access the computer program before the enterprise purchases and manages the computer program and to allow the computer program to implement, after the enterprise purchases and manages the computer program, one or more policies of the enterprise regarding use of the computer program without modifying the computer program.

19 Claims, 6 Drawing Sheets

(51) Int. Cl.
*H04W 12/06* (2021.01)
*G06Q 10/00* (2012.01)
*G06F 21/10* (2013.01)
*H04L 29/06* (2006.01)
*H04L 29/08* (2006.01)

(52) U.S. Cl.
CPC ..... *G06Q 30/0637* (2013.01); *G06Q 30/0645* (2013.01); *H04L 63/0815* (2013.01); *H04L 63/101* (2013.01); *H04W 12/06* (2013.01); *H04L 67/306* (2013.01)

(56) References Cited

U.S. PATENT DOCUMENTS

| | | | |
|---|---|---|---|
| 8,874,640 | B2 | 10/2014 | Rajaraman et al. |
| 9,009,697 | B2 | 4/2015 | Breiter et al. |
| 9,275,160 | B2* | 3/2016 | Ahuja ............... G06F 16/211 |
| 9,438,565 | B2 | 9/2016 | Cohen et al. |
| 10,572,727 | B1* | 2/2020 | Sachtleben ........ G06K 9/00456 |
| 2003/0156719 | A1* | 8/2003 | Cronce ............. G06Q 20/3674 380/256 |
| 2004/0267590 | A1* | 12/2004 | Clark ................ G06Q 30/018 705/26.35 |
| 2007/0239858 | A1 | 10/2007 | Banerji et al. |
| 2008/0096507 | A1* | 4/2008 | Erola ............... H04M 3/42153 455/187.1 |
| 2009/0037492 | A1* | 2/2009 | Baitalmal .............. H04L 67/34 |
| 2010/0077469 | A1* | 3/2010 | Furman ............... G06F 21/41 726/8 |
| 2011/0252415 | A1* | 10/2011 | Ricci ............... G06Q 10/06 717/173 |
| 2013/0219280 | A1* | 8/2013 | Weinstein .......... H04L 67/14 715/736 |
| 2013/0346302 | A1* | 12/2013 | Purves .............. G06Q 20/108 705/40 |
| 2014/0157380 | A1 | 6/2014 | Abrams et al. |
| 2014/0188869 | A1* | 7/2014 | Beckmann ........... G06F 16/22 707/736 |
| 2015/0050922 | A1* | 2/2015 | Ramalingam ..... H04W 12/0027 455/418 |
| 2015/0365778 | A1* | 12/2015 | Khan .................... H04W 8/18 455/419 |
| 2016/0065616 | A1* | 3/2016 | Srikanth ............. H04L 63/0876 726/1 |
| 2018/0330431 | A1* | 11/2018 | Akhter ............. G06Q 30/0637 |
| 2019/0244224 | A1* | 8/2019 | Tonnison ........... G06Q 30/0279 |
| 2020/0342089 | A1* | 10/2020 | Mummadi ............ G06F 21/41 |

OTHER PUBLICATIONS

"International Search Report & Written Opinion Issued in PCT Application No. PCT/US2018/027204", dated Jun. 6, 2018, 14 Pages.

Gey, et al., "Evolving multi-tenant SaaS applications through self-adaptive upgrade enactment and tenant mediation", In Proceedings of the 11th International Symposium on Software Engineering for Adaptive and Self-Managing Systems, May 16, 2016, pp. 151-157.

Chappell, David, "How Seas Changes an ISV'S Business", http://web.archive.org/web/20130320003611/http:/davidchappell.com/writing/white_papers/How_SaaS_Changes_an_ISVs_Business-Chappell_v1.0.pdf, Published on: Mar. 20, 2013, 1-20 pages.

"SaaS Delivery Model", http://web.archive.org/web/20130326142439/http:/apprenda.com/library/software-on-demand/saas-delivery-model/, Published on: May 26, 2013, 5 pages.

Dong, et al., "Process customization based on dependent topology in Software as a Service model", In Proceedings of 2nd International Conference on Software Engineering and Data Mining, Jun. 23, 2010, pp. 295-298.

"SaaS Based Remote Inventory Management System", https://www.semaphore-software.com/semaphoresite/uploads/2016/04/1501.pdf, Retrieved on: Dec. 16, 2016, pp. 1-13

* cited by examiner

AUTOMATIC TAKEOVER OF APPLICATIONS INSTALLED ON CLIENT DEVICES IN AN ENTERPRISE NETWORK

CROSS-REFERENCE TO RELATED APPLICATIONS

This application claims the benefit of U.S. Provisional Application No. 62/506,208, filed on May 15, 2017. The entire disclosure of the application referenced above is incorporated herein by reference.

FIELD

The present disclosure relates generally to developing software and more particularly to a programming model for developing software that allows use before discovery, purchase, and management of the software by an enterprise and that supports enterprise policies without code changes after discovery, purchase, and management of the software by the enterprise.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Software-as-a-service (SaaS) is a software licensing and delivery model in which software is licensed on a subscription basis and is centrally hosted. It is sometimes referred to as "on-demand software." SaaS is typically accessed by users using a thin client via a web browser. SaaS has become a common delivery model for many business applications, including office and messaging software, payroll processing software, management software, development software, and so on. SaaS has been incorporated into the strategy of nearly all leading enterprise software companies.

SUMMARY

A system comprises a processor and machine readable instructions, stored on a tangible machine readable medium and executable by the processor, for a computer program. The machine readable instructions are configured to allow one or more accounts of an enterprise to access the computer program before the enterprise purchases and manages the computer program. The machine readable instructions are configured to allow the computer program to implement, after the enterprise purchases and manages the computer program, one or more policies of the enterprise regarding use of the computer program without modifying the computer program.

In other features, the one or more policies includes a single sign-on authentication service used by the enterprise.

In other features, the machine readable instructions are further configured to allow the computer program to identify an entity of the enterprise to indicate the use of the computer program by the one or more accounts based on identifying information provided by the one or more accounts when accessing the computer program.

In other features, the machine readable instructions are further configured to allow the computer program to identify an entity of the enterprise to indicate the use of the computer program by the one or more accounts based on identifying information collected by an identity-as-a-service used by the computer program to identify the one or more accounts and based on data collected by the identity-as-a-service about the enterprise.

In other features, the machine readable instructions are further configured to allow the one or more accounts to access the computer program, before the computer program is purchased and managed by the enterprise, based on identities of the one or more accounts associated with the enterprise. The machine readable instructions are further configured to allow the one or more accounts to access the computer program, after the enterprise purchases and manages the computer program, based on the identities of the one or more accounts associated with the enterprise and using a single sign-on authentication service used by the enterprise.

In other features, the machine readable instructions are further configured to allow the computer program to provide an option to the one or more accounts, after the enterprise purchases and manages the computer program, to allow the enterprise to access at least a portion of data created by the one or more accounts using the computer program before the computer program is purchased and managed by the enterprise.

In other features, the machine readable instructions are further configured to allow the computer program to provide an option to the one or more accounts, after the enterprise purchases and manages the computer program, to create a separate account to access at least a portion of data created by the one or more accounts using the computer program before the computer program is purchased and managed by the enterprise, and to disallow the enterprise to access the portion of data.

In other features, the machine readable instructions are further configured to allow the one or more accounts to access the computer program, before the computer program is purchased and managed by the enterprise, based on identities of the one or more accounts unassociated with the enterprise. The machine readable instructions are further configured to link, after the enterprise purchases and manages the computer program, the identities of the one or more accounts unassociated with the enterprise to respective identities of the one or more accounts associated with the enterprise. The machine readable instructions are further configured to allow the one or more accounts to access the computer program, after the enterprise purchases and manages the computer program, based on the identities of the one or more accounts associated with the enterprise and using a single sign-on authentication service used by the enterprise.

In other features, the machine readable instructions are further configured to allow the computer program to link the identities after the enterprise purchases and manages the computer program by allowing the one or more accounts to sign on to the computer program using the identities of the one or more accounts unassociated with the enterprise, and by directing the one or more accounts to use the single sign-on service of the enterprise using the respective identities.

In other features, the machine readable instructions are further configured to allow the computer program to provide an option to the one or more accounts, after the enterprise purchases and manages the computer program, to allow the enterprise to access at least a portion of data created by the one or more accounts using the computer program before the computer program is purchased and managed by the enterprise.

In other features, the machine readable instructions are further configured to allow the computer program to provide an option to the one or more accounts, after the enterprise purchases and manages the computer program, to create a separate account to access at least a portion of data created by the one or more accounts using the computer program before the computer program is purchased and managed by the enterprise, and to disallow the enterprise to access the portion of data.

In other features, the machine readable instructions are further configured to allow the computer program to provide an option to the enterprise, after the enterprise purchases and manages and then decides to discontinue using the computer program, to allow an account of the enterprise to continue accessing at least a portion of data created by the account using the computer program before the enterprise decided to discontinue using the computer program. The machine readable instructions are further configured to allow the account to create a separate account with the computer program to continue accessing the portion of data. The machine readable instructions are further configured to disallow the enterprise to access the separate account.

In still other features, a method comprises allowing one or more accounts of an enterprise to access a computer program before the computer program is purchased and managed by the enterprise. The method further comprises implementing, using the computer program, after the enterprise purchases and manages the computer program, one or more policies of the enterprise regarding use of the computer program without modifying the computer program, the one or more policies including a single sign-on authentication service used by the enterprise.

In other features, the method further comprises identifying, using the computer program, an entity of the enterprise to indicate the use of the computer program by the one or more accounts based on identifying information received by the computer program from the one or more accounts when accessing the computer program.

In other features, the method further comprises identifying, using the computer program, an entity of the enterprise to indicate the use of the computer program by the one or more accounts based on identifying information collected by an identity-as-a-service used by the computer program to identify the one or more accounts and based on data collected by the identity-as-a-service about the enterprise.

In other features, the method further comprises allowing the one or more accounts to access the computer program before the computer program is purchased and managed by the enterprise, based on identities of the one or more accounts associated with the enterprise. The method further comprises allowing the one or more accounts, after the enterprise purchases and manages the computer program, based on the identities of the one or more accounts associated with the enterprise and using a single sign-on authentication service used by the enterprise.

In other features, the method further comprises providing, using the computer program, after the enterprise adopts the computer program, an option to the one or more accounts to allow the enterprise to access at least a portion of data created by the one or more accounts using the computer program before the computer program is purchased and managed by the enterprise. Or the method further comprises providing, using the computer program, after the enterprise adopts the computer program, an option to the one or more accounts to create a separate account to access at least a portion of data created by the one or more accounts using the computer program before the computer program is purchased and managed by the enterprise, and disallow the enterprise to access the portion of data.

In other features, the method further comprises allowing the one or more accounts to access the computer program before the computer program is purchased and managed by the enterprise, based on identities of the one or more accounts unassociated with the enterprise. The method further comprises linking, after the enterprise purchases and manages the computer program, the identities of the one or more accounts unassociated with the enterprise to respective identities of the one or more accounts associated with the enterprise. The method further comprises allowing the one or more accounts to access the computer program after the enterprise purchases and manages the computer program, based on the identities of the one or more accounts associated with the enterprise and using a single sign-on authentication service used by the enterprise.

In other features, the method further comprises providing, using the computer program, an option to the enterprise, after the enterprise purchases and manages and then decides to discontinue using the computer program, to allow an account of the enterprise to continue accessing at least a portion of data created by the account using the computer program before the enterprise decided to discontinue using the computer program; to allow the account to create a separate account with the computer program to continue accessing the portion of data; and to disallow the enterprise to access the separate account.

In still other features, a system comprises a processor and machine readable instructions, stored on a tangible machine readable medium and executable by the processor, for devising a computer program. The machine readable instructions are configured to allow one or more accounts of an enterprise to access the computer program before the computer program is purchased and managed by the enterprise. The machine readable instructions are configured to indicate use of the computer program by the one or more accounts to an entity in the enterprise. The machine readable instructions are configured to allow the one or more accounts to access the computer program after the enterprise purchases and manages the computer program in response to the indication, using a single sign-on authentication service of the enterprise without modifying the computer program. The machine readable instructions are configured to allow the one or more accounts, after the enterprise purchases and manages the computer program, to keep at least a portion of data created before the enterprise adopts the computer program inaccessible by the enterprise. The machine readable instructions are configured to allow the one or more accounts, in response to the enterprise purchasing and managing and then discontinuing use of the computer program, to access at least a portion of data created before the enterprise decided to discontinue using the computer program.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

In the present disclosure, a non-managed Software as a Service (SaaS) application is an application that users within an enterprise organization are using but the information technology (IT) administrators for the enterprise organization either do not know about the application or have not taken any explicit action to control. Individual User Consent means the following. When a user inside an organization directory (e.g., element 14 shown in FIG. 1) who wishes to use a non-managed application (e.g., element 10 shown in FIG. 1) is presented with an option (e.g., a User Interface) from the organization directory requesting consent from the user before the organization directory shares any data with the non-managed application. The IT administrators of the organization directory control the policy regarding what data is allowed to be shared with the non-managed application. A Local Account/Email Verified User Account means the following. A SaaS application will establish a set of credentials by having a user provide an email, prove ownership of that email by receiving a secret code or clicking on a web link in an email, and then supply a password to be used that the application. Further, the terms takeover and adopt as used throughout the present disclosure refer to discovery, purchase, and management of the application by the enterprise Cloud-based active directory is a comprehensive identity and access management cloud solution that provides a robust set of capabilities to manage users and groups in a cloud computing system. The cloud-based active directory helps secure access to on-premises and cloud applications, including many different Software-as-a-Service (SaaS) applications.

There is a recent technology shift in the industry towards delivering Software as a Service (SaaS), where the software is generally hosted and managed by an independent software vendor (ISV) outside of the enterprise corporate network. In the past, the corporate firewall served as the perimeter securing access to software, and applications were hosted on servers within the corporate firewall and managed by the enterprise. In the SaaS model, identity used to authenticate access to software serves as the perimeter securing access to SaaS applications hosted by ISVs.

SaaS application vendors today have been experimenting with freemium/viral models, where the ISVs gain organic adoption within an enterprise by signing up users with their work email (or social identities) and an application-specific password. The ISVs expand by allowing the users to invite coworkers to allow collaboration on files or workspaces. After that, the software vendor attempts to identify a decision maker willing to purchase an enterprise SKU for the SaaS application to enable additional features such as Single Sign On (SSO) that are typically part of the enterprise information technology (IT) policy. This situation presents a set of problems for both the ISV and an IT administrator of the enterprise. Below is a non-exhaustive list of the problems.

It is difficult for the ISV to identify the decision maker to offer the enterprise SKU. For example, the decision maker might be an IT administrator, a senior manager, or chief information officer (CIO). The IT administrator of the enterprise can be completely unaware of adoption of SaaS applications within their enterprise and needs to discover which SaaS applications are being used and in which parts of the organization. Today, there is no consistent and easy way for the IT department of an enterprise to take over management of a SaaS application once the IT department discovers that the SaaS application is being used in the enterprise. There will be situations in which the users may have incorrectly used their work email for something that is non-work related. The user needs a way to keep non-work related material private and consent to takeover of work-related material by the IT department of the enterprise. The enterprise needs controls to enforce SSO for material that is work related and block further use of enterprise email domain for non-work related activity.

In addition to the above problems, when managing many SaaS applications, the IT department needs consistent ways to manage these applications in bulk. For example, the IT department needs a consistent identity policy that can be applied to any SaaS application to control things such as SSO enforcement, access expiration lifetime, conditional access, and multi-factor authentication. The IT department needs consistent audit reporting across all applications to easily understand who attempted to access what and when, and if access was granted. The IT department needs a clear path to satisfying security and compliance standards that save time for both the ISV and the enterprise. The IT department needs an easy way to manage piloting applications to certain workgroups within the enterprise before a broad rollout within the enterprise.

Presently, some ISVs attempt to manually identify an appropriate decision maker to offer the sale of their enterprise SKU. Some identity-as-a-service (IDaaS) providers have the ability to manage identity for many SaaS applications and enforce an identity policy such as conditional access or second factor authentication. However, these solutions focus on solving the problem only from the IT administration side. The present disclosure proposes a programming model that the ISV can use to develop an application with built in features that would enable a broader set of policies that could be enforced such as geo-location, auditing, security, and one click takeover not supported by others today.

For example, some solutions provide a unified programming model that allows applications to support app-local (local-to-application), social, or enterprise identities, but does not expose discoverability or takeover controls to the enterprise. The enterprise has to manually contact the ISV, and the ISV has to reconfigure the authentication portion of the application on the backend to support single sign-on employed by the enterprise as part of its IT policy. The present disclosure proposes a programming model that empowers both the ISV and the enterprise with the appropriate controls to support a smoother freemium upsell to be managed by the enterprise, helps the ISV in building applications that are enterprise-ready, and provides enterprises with the necessary management controls.

The present disclosure proposes a programming model that enables the ISVs to develop SaaS applications that support organic adoption within enterprises using app-local or social identities and that support work/school enterprise identities after takeover of the applications by the enterprises without any code changes to the applications. No code changes to the applications are required after takeover to support enterprise IT policies such as SSO since the applications designed with the proposed programming model are already enterprise-ready (i.e., ready to support enterprise policies such as SSO). The proposed programming model helps the ISVs build enterprise-ready applications that satisfy enterprise policy requirements around identity, security, auditing, compliance, and piloting.

Further, when an application is built using the proposed programming model, usage within the application is exposed to the enterprise. For example, the usage could be exposed to a senior manager within the organization as well as the IT administrator. Because the cloud-based active directory understands the organizational structure of an enterprise, the cloud-based active directory could use an intelligent heuristic to guess which manager would have the most invested interest in purchasing an enterprise SKU. For example, for consumption of a sales SaaS application in the sales team, notifying the vice president of the sales department as well as the IT administrator would be a good strategy. Once the enterprise understands how consumption of the SaaS application within the enterprise is growing, and where in the organization consumption is occurring, the enterprise has the data needed to begin negotiation for purchasing an enterprise contract with the ISV.

Once a contract (or trial contract) is in place, the IT administrator can click one button to bring the application under the management of the IT department with comprehensive IT policy controls in place. Piloting controls within the application, which are provided by building the application using the proposed programming model, allow the organization to selectively assign users or groups to a pilot (limited) version of the application and enforce a variety of management controls (around identity, security, auditing, compliance) according to the IT policy of the enterprise. Once the IT department is satisfied with the application, the IT department can roll out the application with full features to a wider audience within the organization.

After a takeover request by the IT department, a user that created an account with the SaaS application before the takeover can be presented with a consent option to satisfy legal requirements. This allows the user to opt-in, thereby agreeing that the user's data created before the takeover belongs to the enterprise. If the user opts-out, the policy from the IT administrator can still force the user to migrate the account to a non-work email. The IT policy can also enforce that new users attempting to sign up for the SaaS application with their work email be presented with the consent option before they start using the application, where the users can agree that the data that will be created using the new user accounts will belong to the organization.

Figure 1:
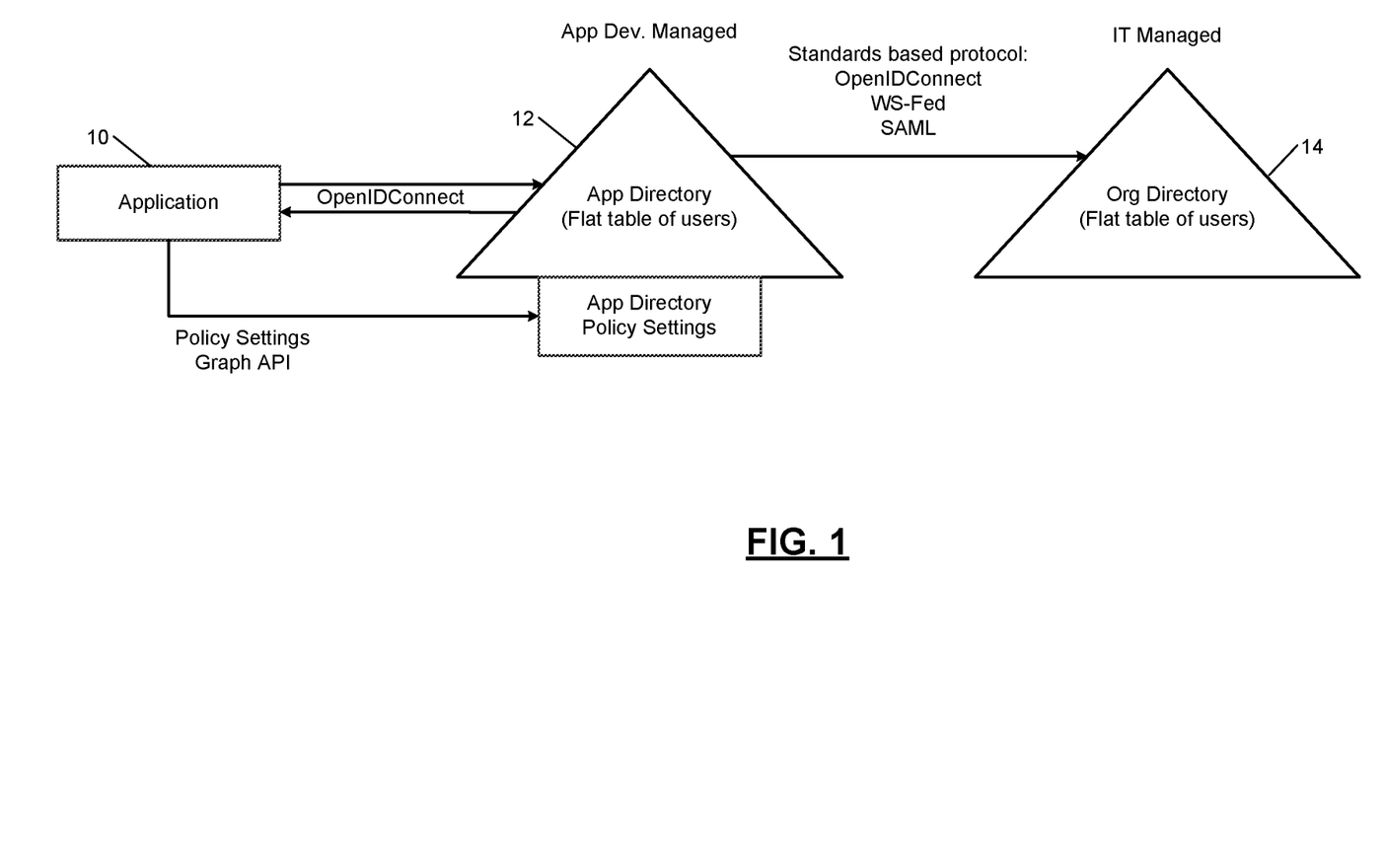
FIG. 1 is a schematic representation of how an application developed using a programming model according to the present disclosure can sign up users and can then transition to being discovered, purchased, and managed by an enterprise without requiring any changes to the code.

FIG. 1 shows a schematic representation of how an application 10 developed using the programming model according to the present disclosure can sign up users organically and, without having to change any of the code, how the application 10 can seamlessly transition to being adopted within the enterprise and implement all the features of the enterprise IT policy. The application 10 creates an application directory 12 (e.g., an on-premise active directory or cloud-based active directory), which is essentially a flat table of users (e.g., from one or more enterprises) that sign up to access the application 10 using different identities. For example, some of the users from an enterprise may use their enterprise-issued email accounts (e.g., username@companyname.com) to access the application 10 while others may use their social media identities (e.g., identities used to log into Facebook) or personal email accounts. These identities are stored in the application directory 12 and are used by the application 10 to authenticate access by the users to the application 10. In addition, the application 10 can use a graph API to store metadata associated with the users in the flat table, such as phone numbers and so on (i.e., additional identifying or personal information) collected from the users when the users sign up to access the application 10. The application 10 and the application directory 12 use OpenID Connect protocol to perform authentication, which is an interoperable authentication protocol based on the OAuth 2.0 family of specifications.

The IT department of an enterprise creates an organization directory 14 (e.g., an on-premise or cloud-based active directory). The organization directory 14 stores credentials (i.e., identities or identifying information) of the users within the enterprise that are collected by the IT department. In addition, the organization directory 14 stores metadata associated with the users within the enterprise. The credentials are used to authenticate access by the users to applications managed by the IT department. The enterprise may employ IT policies such as allowing SSO-based access to the applications managed by the IT department using identities such as enterprise-issued email accounts stored in the organization directory 14. The organization directory 14 may include identities of some of the users that are accessing the application 10 that is not yet managed by the IT department (i.e., the application 10 is not yet taken over or adopted by the enterprise) and also of users that are not yet exposed to the application 10.

The application directory 12 and the organization directory 14 may use any of these protocols to perform authentication: OpenID Connect; WS-Federation (Web Services Federation), which is an identity federation specification; or Security Assertion Markup Language (SAML), which is a XML-based framework to exchange security related information.

The application 10 can be discovered within the enterprise in many ways. For example, the users using the application 10 can inform a right entity or person within the enterprise that they are using the application 10 and that they would like the enterprise to purchase the application 10. Alternatively, the organization directory 14 has data indicating which users from the enterprise log into the application 10, and the organization directory 14 has the organization chart for the enterprise. Accordingly, if the users in the sales department of the enterprise start using the application 10, and if the application 10 is not popular outside the sales department, an email notification could be sent to the VP of the sales department and to the IT department showing a chart of the adoption of the application 10 within the sales department. This data would also be useful to both parties (the enterprise buying the software, and the ISV selling the software) for negotiating a contract.

The following description explains in further detail the processes that can occur when the application is developed using the programming model according to the present disclosure and when the application is not developed using the programming model according to the present disclosure. When the application is not developed using the programming model according to the present disclosure, users manually inform the right entity or person (such as the IT administrator) that application 10 exists and that they would like to purchase application 10. This is what enterprises presently do. Presently, the IT administrator does not have complete data about who is using the application and lacks data about how many users they need to license. The IT administrator may waste time figuring out how to contact the ISV to purchase the application. In contrast, when the application is developed using the programming model according to the present disclosure, first, if the organization directory 14 has a policy that allows issuing authentication tokens to non-managed applications (e.g., application 10) based on individual user consent, the organization directory 14 (and application directory 12) would be able to maintain data indicating which users from the enterprise log into the application 10. Second, if the organization directory 14 has a policy that does not allow issuing authentication tokens to non-managed applications based on individual user consent, only the application directory 12 would be able to maintain data indicating which users from the enterprise log into the application 10 because the users would be logging in with an app-local account. That is, the users would be logging in using a work email verified by emailing a secret code, but a password that the user provides that only works with the family of apps that use the application directory 12 for authentication.

The application 10 can also learn about the enterprise from the domain name of the enterprise found in the identities used by the users to access the application (e.g., @companyname.com). The following description explains in further detail the processes that can occur when the application is developed using the programming model according to the present disclosure and when the application is not developed using the programming model according to the present disclosure. When the application is not developed using the programming model according to the present disclosure, the application might assume that users from the same domain @companyname.com all belong to the same enterprise. However, it is impossible to maintain an exhaustive list of all free email providers where the domain does not represent an organization boundary. For example, if a user types in an email received from Yahoo Japan, the domain would also include many other individuals or users from other organizations, and making it easy to share data with this group of users is not desirable. On the other hand, when the application is developed using the programming model according to the present disclosure, if the organization directory 14 has a policy that allows issuing authentication tokens to non-managed applications based on individual user consent, and if a user from the organization directory 14 provides Individual User Consent for the application 10, the organization directory 14 would provide the application 10 with sufficient data segment all data for that enterprise and provide a way for easily sharing data within the boundary of the enterprise.

The application 10 may be able to look up the enterprise in a database and identify a right entity or person within the enterprise under certain conditions. For example, the application 10 will only get limited access to the organization directory 14 based on individual user consent. It is more likely that a third party (provider of the programming model; an entity other than the ISV and the enterprise) which is hosting both the application 10 and the organization directory 14 could broker the exchange without needing to reveal all of the entities or persons within the enterprise to the application 10.

In some situations, the application may already be implemented without using a third party's (programming model provider's) identity stack. The third party may expose a way of instrumenting the application which is using Local Accounts/Email Verified User Accounts for logins, accessing any resource that is interesting from an auditing, and a session ending from logout or inactivity. Application developers may be reluctant to share this data with the third party if the organization is not using a directory hosted by the third party and there is no clear benefit of being able to upsell to the IT administrator. Therefore, the programming model can allow applications to validate that the third party (provider of the programming model) is indeed hosting the organization directory before this information is shared with the third party.

The application 10 can notify the identified entity that users from the enterprise are using the application 10 and that the enterprise could purchase the application 10. For example, if the application 10 is using a cloud provider, the cloud provider may have a database of organizations that the application 10 can use to identify and notify a right entity or person within the enterprise. Further, if both the application directory 12 and the organization directory 14 are cloud-based (i.e., if both the ISV and the enterprise use a cloud-based portal (see cloud computing system 200 shown in FIG. 9)), the portal can expose the application 10 to the IT administrator of the enterprise (i.e., through the portal, the IT administrator of the enterprise can learn about (i.e., discover) the use of the application 10 by the users from the enterprise).

After the discovery of the application 10 by the enterprise as above and after the sale of the application 10 to the enterprise, which can be facilitated by the portal or the application 10, the portal or the application 10 can provide the IT administrator of the enterprise a single click takeover functionality (e.g., a button requiring a single click). By clicking on the button, the IT administrator can adopt the application 10 within the enterprise and manage the application 10 using the enterprise IT policy such as SSO-based access to the application 10 for existing and new users within the enterprise.

Figure 9:
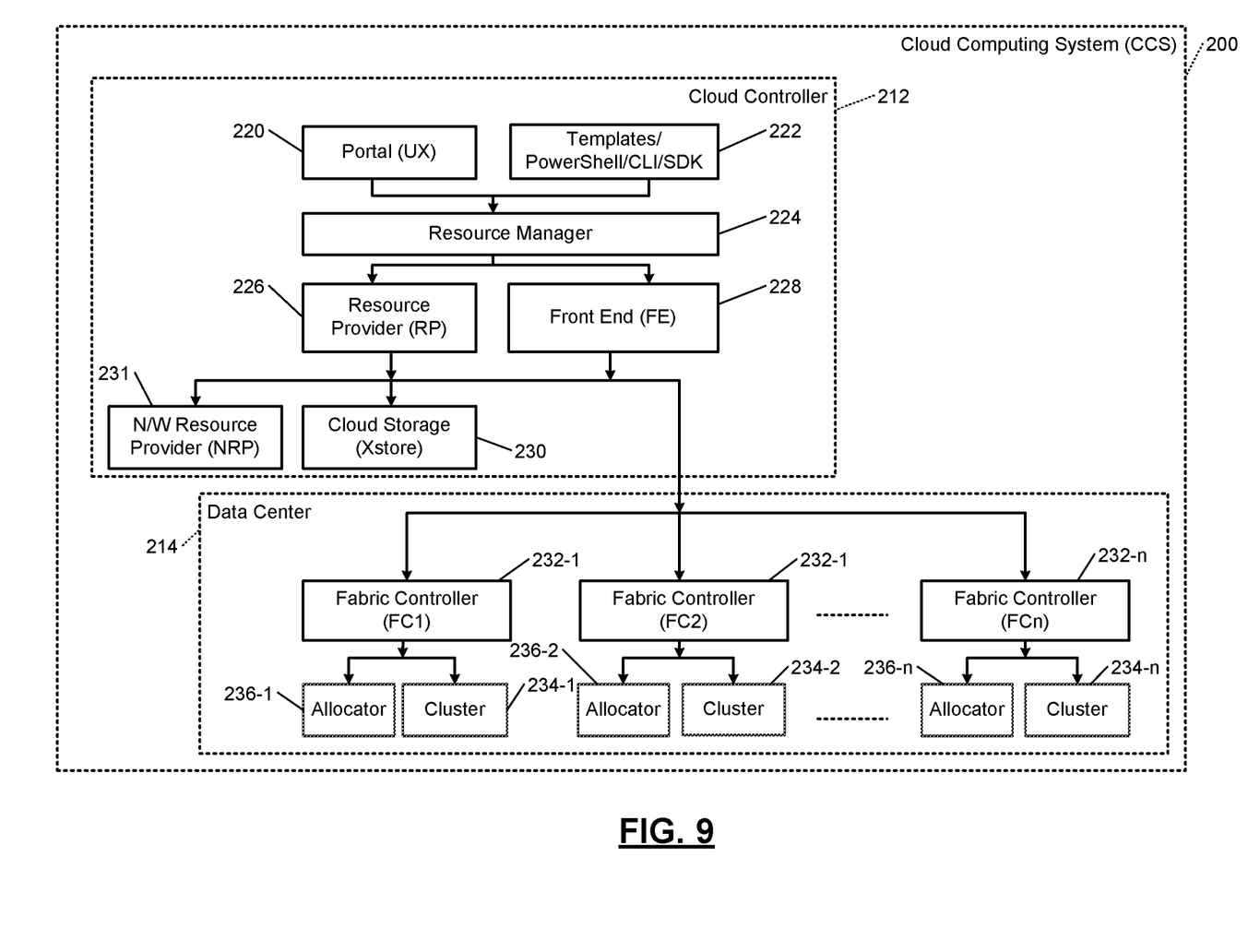
FIG. 9 is a functional block diagram of a simplified example of a cloud computing system.

If the ISV that developed the application 10 and the enterprise use a cloud-based Identity-as-as-service for authentication, the IT administrator of the enterprise can be exposed to the one-click takeover experience through the cloud-based portal (see portal 220 shown in FIG. 9). Negotiation of the contract would still occur either over the phone, or through a web-based purchase flow. After payment is confirmed by the ISV by an API call, the cloud provider would create the necessary application registration in the cloud-based active directory including an application specific redirect URI in the cloud-based active directory tenant, a client ID, and client secret, and configure them properly for use by the application 10. Single Sign On at this point would be immediately available to all the users within the enterprise. In contrast, today this process of implementing specific IT policies of the enterprise such as enabling SSO for the new application after the application is purchased by the enterprise is usually done by exchanging information between the ISV support team and the IT staff of the enterprise over the phone and requires the ISV to make code changes to the application.

At this point (i.e., after the takeover according to the present disclosure as described above), data can be migrated from the application directory 12 to the organization directory 14 so that the IT administrator can start managing the properties (e.g., additional identifying or personal information of the users such as phone numbers). For example, the enterprise can have better quality metadata on the users than the application 10. Accordingly, the higher quality metadata that the enterprise has in the organization directory 14 may supersede the metadata that the application 10 has in the application directory 12.

During the takeover process, the identities of the users in the application directory 12 are linked to the identities of the users in the organization directory 14. Data between the application directory 12 and the organization directory 14 is reconciled using rule sets that can be applied to both the application layer (i.e., to the application 10) and the IT administration layer to decide which data should take precedence.

In addition, depending on the application 10, many data privacy concerns can be addressed. For example, from the data that has been created by the users before the application 10 is adopted by the enterprise (i.e., before takeover), what data can be accessed by the enterprise and what data should be kept private and can be accessed only by the users is determined. A grace period can be provided to the users after which the private data will no longer be private and will be accessible by the enterprise, and so on. These issues relating to identity mismatches and data privacy are explained below in further detail.

For example, there may be a mismatch between the user identities in the application directory 12 and in the organization directory 14. Specifically, while sometimes there may be an exact match based on the identity (e.g., email address) that the application directory 12 and the organization directory 14 share, sometimes this may not be the case. Instead, for example, the application 10 may allow the users to use usernames, or the email address that a user uses to access the application 10 may be different than the identity of the user in the organization directory 14 (firstname@companyname.com vs. firstname.lastname@companyname.com).

After the takeover, the time consuming task of manually linking up users can be eliminated due to the features that can be embedded in the application 10 when the application is developed using the programming model of the present disclosure. For example, the users could be notified (e.g., via email) that the enterprise has taken over the application 10. When the users access the application 10 after the takeover, for all of the non-exact identity matches (i.e., users using different identities to access the application than their enterprise-issued identities), the application 10 could include a feature that accepts their old username/password in the old system (i.e., using the application directory 12) and then redirects the users to the organization directory 14 to login as well. Once the user has logged into both systems, these two identities (a different identity used to log into the application 10 before takeover (e.g., personal email or social identity) and enterprise-issued identity) of the user are linked, and the data is reconciled/migrated as necessary.

After the takeover, the following process would be used when data needs to be reconciled from the application directory 12 to the organization directory 14. For data that exists in the application directory 12 but not in the organization directory 14, the data should be synced to the organization directory 14 with the consent of the IT administrator. API calls by the application 10 to access this data should use the data in the organization directory 14 as the default from this point forward, but the application 10 can optionally request a value that is in the application directory 12 instead. At this point, the application 10 could try and update the data as appropriate in the organization directory 14, but under policy/permissions provided by the IT administrator. If the permission is denied by the IT administrator, the data can always be written by the application 10 into the application directory 12.

After the takeover, the privacy concerns regarding the users accessing personal data associated with the application 10 using their work email can be addressed as follows. For example, a user could sign up for an application (e.g., the application 10) that is used both in consumer and business context. The user may be storing information about personal matters that should not be shared with the enterprise. Then the enterprise decides to purchase an enterprise SKU of the application 10. At a minimum, the user is given the choice to accept the request by the enterprise to takeover governance of the account, or to relink the account to a personal email instead to keep the data private. The application 10 can provide an even better experience by notifying the user (e.g., via email) that the user has some personal data and providing the user a choice for selecting which files include personal data. The personal files can be re-indexed to a new account identifier that the user can provide. (If the user simply renames the account to keep data private, the identifier does not change; only the account email would change). This allows users to separate work and personal data that both exist in one account.

In some instances, after some time following the takeover, the enterprise may decide to discard or abandon (i.e., to discontinue use of) the application 10. At this point, the application 10 can offer a free experience (allow users to continue using the application 10) in the hopes of convincing the enterprise to upgrade again later. In this case, the link from the application directory 12 to the organization directory 14 is severed. After the enterprise discontinues use of the application 10, users from the enterprise that access the application 10 can get an opportunity to validate ownership of their email (e.g., by clicking a link in an email they receive) and to establish a password to setup their own account with the application 10. (After the takeover, since the enterprise was validating credentials, the application 10 may not have collected a password for this user yet.) Subject to approval by the enterprise, the users can continue to access some of the data they created after the takeover using the newly setup accounts with the application after the discontinuation occurs.

The application 10 developed using the proposed programming model can also include features that ensure compliance with other policies that may be implemented by enterprises. For example, some enterprises may require ISVs to store data in specific geographical regions. The enterprises can set these policies in a cloud-based active directory tenant. These policies can then be automatically enforced by the cloud provider identity platform for applications such as application 10 that build on (i.e., that are developed using) the cloud provider identity platform.

In some instances, the ISV may design the application 10 to forgo authentication (i.e., offload and therefore not build authentication support) by developing the application 10 using the cloud provider identity platform, which can handle authentication for the application 10 (which is transparent to users accessing the application 10 before takeover). The application 10 can also be designed to set its policy settings on the cloud provider identity platform. The application 10 can be designed to setup the policy settings using Graph APIs that call into the cloud provider identity platform. The cloud provider identity platform may also host the application directory 12 and/or host the organization directory 14 in the cloud-based active directory. The API can control login flows, use of attributes collected from the user, and the takeover policy described above (e.g., privacy concerns, sourcing correct attributes if a conflict occurs between the application and organization directories 12, 14, and so on). The application developer (e.g., the ISV of the application 10) may setup some of these settings in advance on the portal of the cloud provider while some of the takeover related operations may be performed by the application 10 during runtime.

Figure 2:
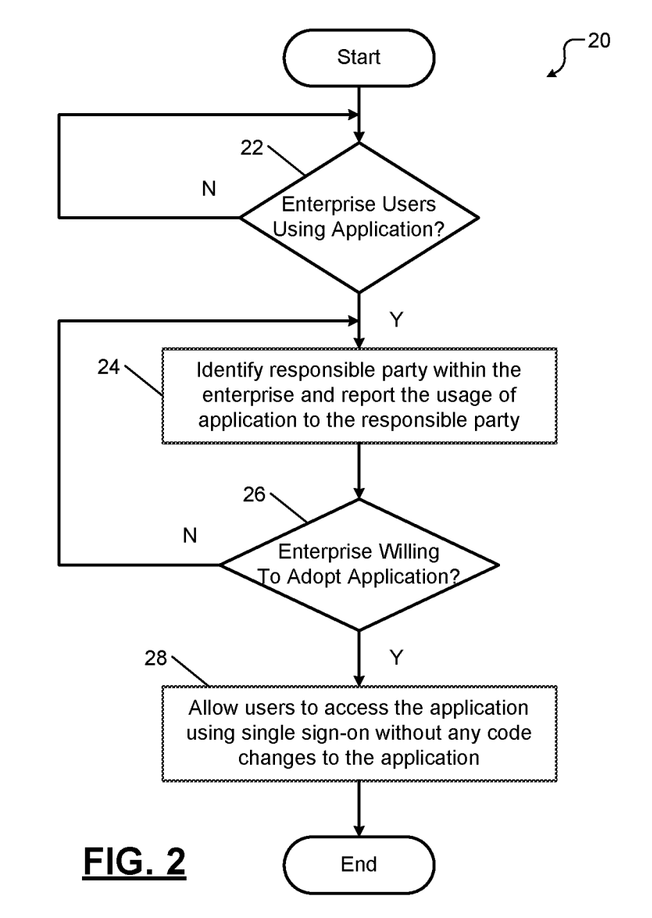
FIG. 2 is a flowchart of a method for discovering, purchasing, and managing the application by the enterprise.
Figure 3:
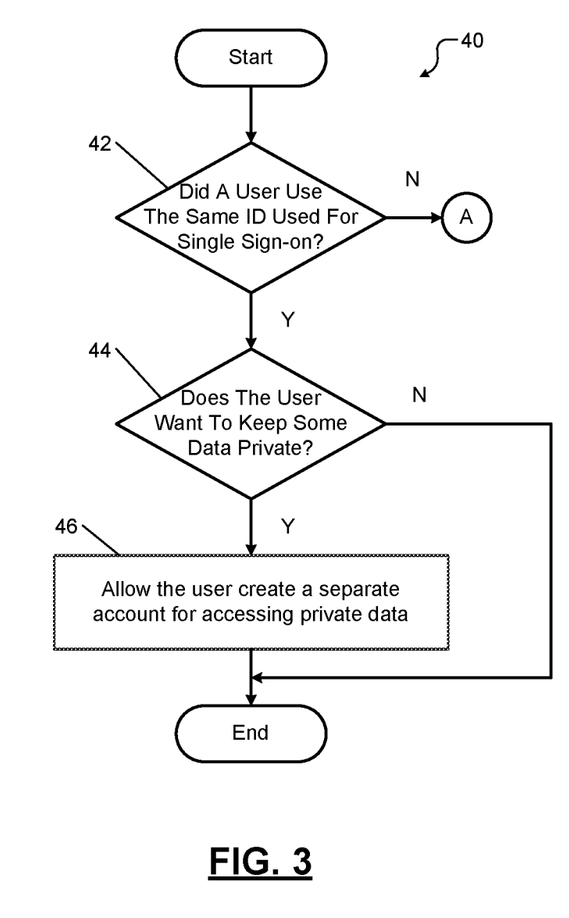
FIG. 3 is a flowchart of a method for keeping personal user data private after discovery, purchase, and management of the application by the enterprise.
Figure 4:
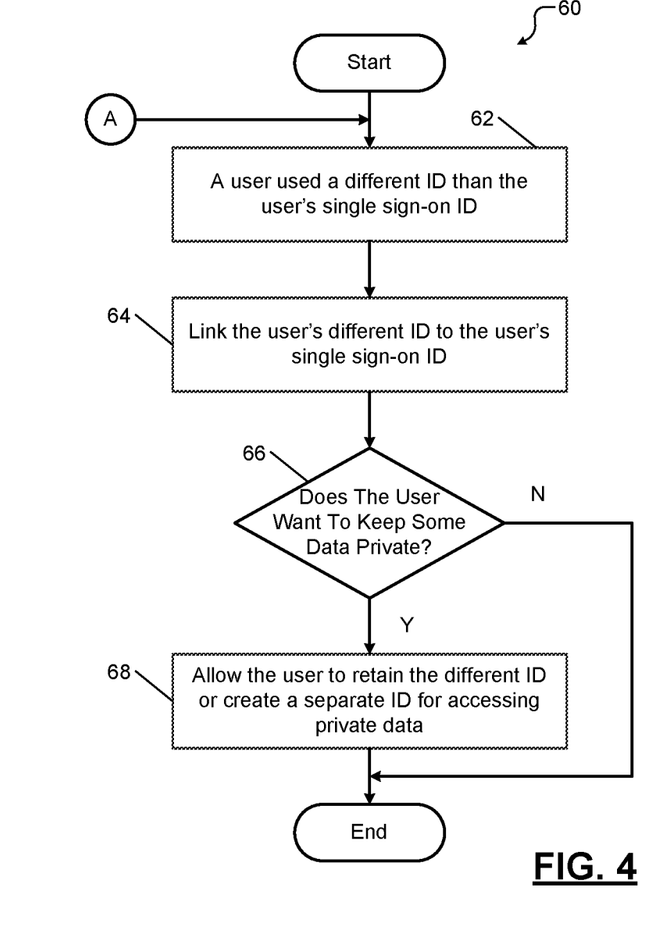
FIG. 4 is a flowchart of a method for linking user identities during the discovery, purchase, and management of the application by the enterprise.
Figure 5:
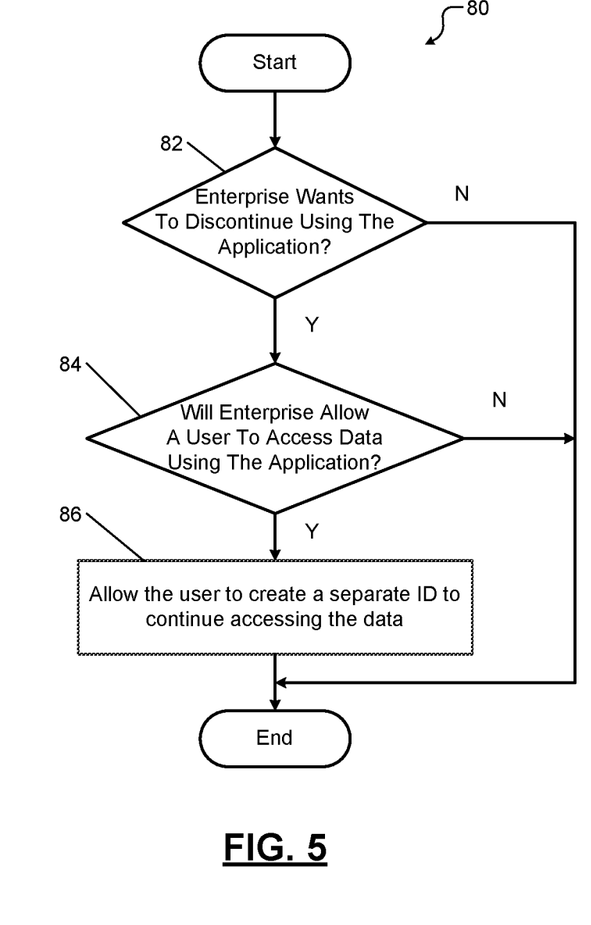
FIG. 5 is a flowchart of a method for managing user data after the enterprise discontinues use of the discovered, purchased, and managed application.

FIGS. 2-5 show the methods for implementing the programming model according to the present disclosure. FIG. 2 shows a method 20 for discovering and taking over an application (e.g., the application 10) in an enterprise. FIG. 3 shows a method 40 for keeping personal user data private after the takeover of the application (e.g., the application 10) in the enterprise. FIG. 4 shows a method 60 for linking user identities during the takeover. FIG. 5 shows a method 80 for managing user data after the enterprise discontinues use of the adopted application. The following description of these methods is kept brief for brevity since the operations performed by these methods are already described above in detail.

In the description of the methods below, the term control refers to one or more of the application 10, the application directory 12, the organization directory 14, and the identity platform (or Identity-as-a-service) and the portal of the cloud provider described above. One or more server applications 186 described below with reference to FIGS. 6-8 may implement the control. In other words, the term control as used in the description of the methods below represents code or instructions executed by one or more components of one or more servers 130 shown in FIGS. 6-8 to perform the described functionality.

In FIG. 2, the method 20 for discovering and taking over an application (e.g., the application 10) in an enterprise performs the following operations. At 22, control determines whether any enterprise users are using an application (e.g., the application 10) that is not yet adopted or taken over by the enterprise. At 24, if any enterprise users are using the application that is not yet adopted or taken over by the enterprise, control identifies a responsible party within the enterprise and reports the use of the application by the users of the enterprise to the responsible party. At 26, control determines whether the enterprise is willing to purchase and adopt (i.e., takeover) the application. Control returns to 24 if the enterprise is not yet willing to purchase and adopt (i.e., takeover) the application. At 28, if the enterprise is willing to purchase and adopt (i.e., takeover) the application, upon completion of the purchase, control allows the existing as well as new users from the enterprise to access the application using single sign-on policy of the enterprise without requiring any code changes to the application.

In FIG. 3, the method 40 essentially describes some of the details of the element 28 of the method 20 shown in FIG. 2. The method 40 for keeping personal user data private after the takeover of the application (e.g., the application 10) in the enterprise performs the following operations. At 42, after the takeover of the application by the enterprise, control determines whether any of the users accessed the application before the takeover using the same identities that are used for the single sign-on policy of the enterprise. At 44, if any of the users accessed the application before the takeover using the same identities that are used for the single sign-on policy of the enterprise, control determines whether any of the users want to keep some of the data created before the takeover private (i.e., not accessible by the enterprise). At 46, if any of the users want to keep some of the data created before the takeover private, control allows the users to create a separate account to continue accessing the data that the users want to keep private. Otherwise, control allows the enterprise to access and manage all of the data created by the users before the takeover.

In FIG. 4, the method 60 essentially describes some of the details of the element 28 of the method 20 shown in FIG. 2. The method 60 for linking user identities during the takeover performs the following operations. Specifically, the method 60 performs operations starting at 62 if control determines at 42 in the method 40 (shown in FIG. 3) that any of the users accessed the application before the takeover using different identities than those used for the single sign-on policy of the enterprise. At 62, after the takeover of the application by the enterprise, if any of the users used different identities to access the application before the takeover than those used for the single sign-on policy of the enterprise, control determines which user used a different identity than the user's single sign-on identity to access the application before the takeover. At 64, control links the user's different identity to the user's single sign-on identity. At 66, control determines whether any of the users want to keep some of the data created before the takeover private (i.e., not accessible by the enterprise). At 68, if any of the users want to keep some of the data created before the takeover private, control allows the users to retain the different identity or to create a separate account to continue accessing the data that the users want to keep private. Otherwise, control allows the enterprise to access and manage all of the data created by the users before the takeover.

In FIG. 5, the method 80 essentially describes operations that can be performed after completion of the takeover in the method 20 (i.e., after completion of the method 20) shown in FIG. 2. The method 80 for managing user data after the enterprise discontinues use of the adopted application performs the following operations. At 82, after the takeover of the application by the enterprise, control determines whether the enterprise wants to discontinue using the application. At 84, if the enterprise wants to discontinue using the application, control determines whether the enterprise will allow a user to access any of the data that the user created after the takeover using the application. At 86, if the enterprise will allow the user to access any of the data that the user created after the takeover using the application, control allows the user to create a separate identity for accessing the application and the data after the enterprise discontinues using the application.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 6:
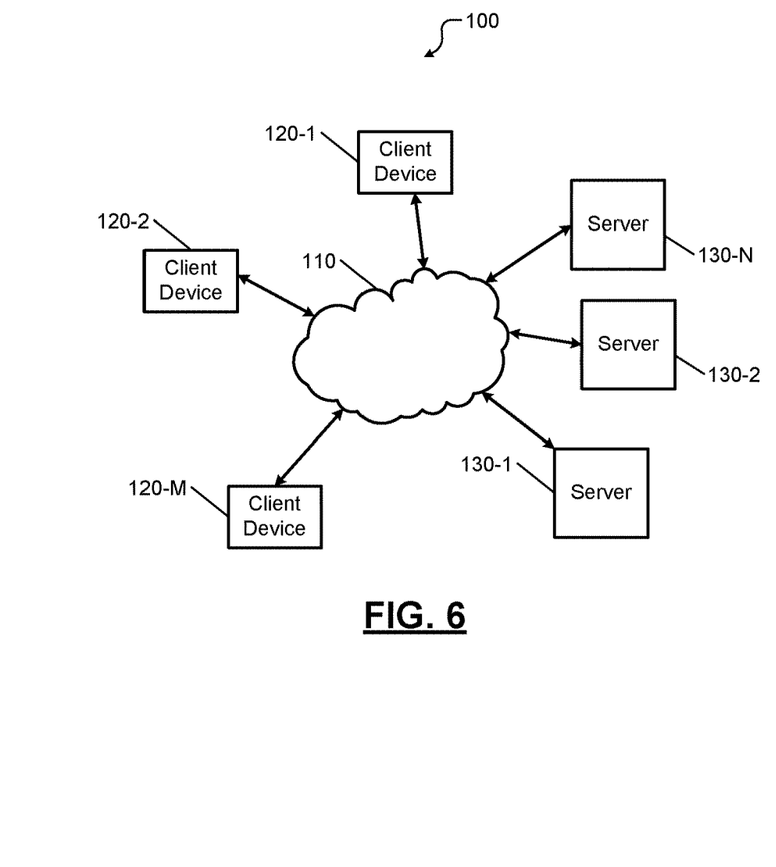
FIG. 6 is a functional block diagram of a simplified example of a distributed network system.

FIG. 6 shows a simplified example of a distributed network system 100. The distributed network system 100 includes a network 110, one or more client devices 120-1, 120-2, . . . , and 120-M (collectively client devices 120) (where M is an integer greater than or equal to one), and one or more servers 130-1, 130-2, . . . , and 130-N (collectively servers 130) (where N is an integer greater than or equal to one). The network 110 may include a local area network (LAN), a wide area network (WAN) such as the Internet, or other type of network (collectively shown as the network 110). The client devices 120 communicate with one or more of the servers 130 via the network 110. The client devices 120 and the servers 130 may connect to the network 110 using wireless and/or wired connections to the network 110.

For example, the client devices 120 may include smartphones, personal digital assistants (PDAs), laptop computers, personal computers (PCs), and so on. The servers 130 may provide multiple services to the client devices 120. For example, the server 130 may execute a plurality of software applications developed by one or more software vendors. The server 130 may host multiple databases that are utilized by the plurality of software applications and that are used by users of the client devices 120.

The servers 130 may include servers associated with the enterprises described above with reference to FIGS. 1-5. The client devices 120 may include client devices used by the users associated with the enterprises described above with reference to FIGS. 1-5. One or more of the servers 130 and one or more of the client devices 120 may be located in different departments and/or different geographical locations of the enterprises. The servers 130 may also include servers associated with the ISV that may host the application 10 described above with reference to FIGS. 1-5. One or more of the servers 130 may be located on-premise and/or in a cloud computing system (e.g., CCS 200 shown in FIG. 9) provided by a cloud provider. One or more of the servers 130 and one or more of the client devices 120 may also be used to implement the cloud computing system (e.g., CCS 200 shown in FIG. 9) provided by the cloud provider.

Figure 7:
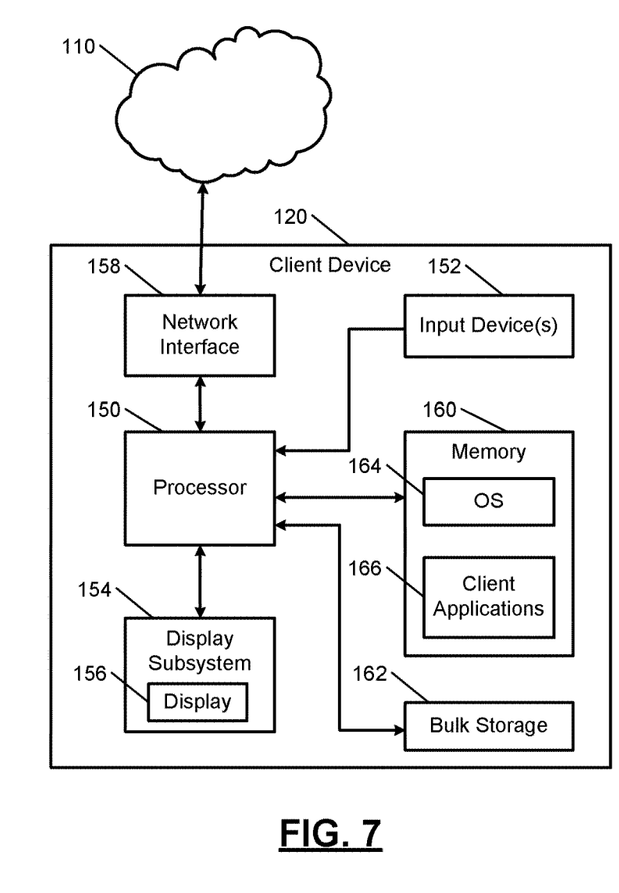
FIG. 7 is a functional block diagram of a simplified example of a client device used in the distributed network system of FIG. 6.

FIG. 7 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110.

Figure 8:
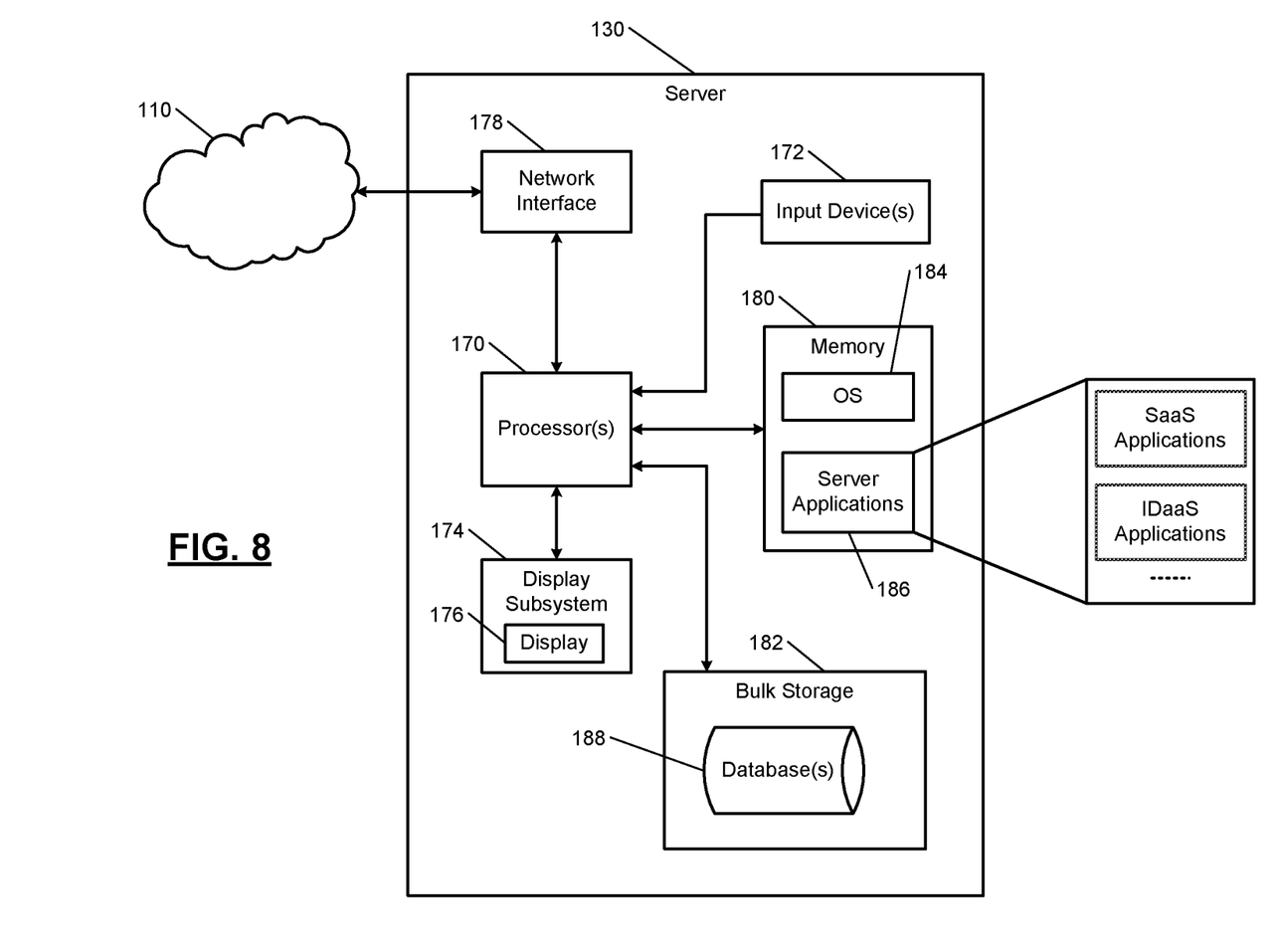
FIG. 8 is a functional block diagram of a simplified example of a server used in the distributed network system of FIG. 6.

FIG. 8 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The server applications 186 include the application 10 and other applications to implement the systems and methods described above with reference to FIGS. 1-5. Additionally, the server applications 186 include applications to implement the cloud functionalities described above with reference to FIGS. 1-5. The bulk storage 182 may store one or more databases 188 that store data structures used by the server applications 186 to perform respective functions.

FIG. 9 shows a simplistic example of a cloud computing system (CCS) 200 according to the present disclosure, which is referenced above in the description of FIGS. 1-8. The cloud computing system 200 includes a cloud controller 212 and at least one data center 214. While only one data center 214 is shown for simplicity, the cloud controller 212 can interface with a plurality of data centers. Further, while the data center 214 is shown as being local to the cloud controller 212, one or more data centers may be geographically remote from the cloud controller 212, may be located in different geographic locations (e.g., in different time zones, different countries or continents, and so on), and may communicate with the cloud controller 212 via various networks. The cloud controller 212 controls one or more data centers 14.

Each data center 214 includes a plurality of fabric controllers 232-1, 232-2, . . . , and 232-n (collectively the fabric controllers 232) and corresponding clusters 234-1, 234-2, . . . and 234-n (collectively the clusters 234). Each fabric controller 232 controls a respective cluster 234. Each cluster 234 includes a plurality of racks (not shown), and each rack includes a plurality of nodes (also not shown), which are also referred to as servers, hosts, or machines throughout the present disclosure. Each fabric controller 232 is associated with an allocator 36 that allocates resources within the cluster 234 for instances of customer services hosted on the cluster 234.

The cloud controller 212 includes a portal 220 and a software development kit (SDK) 222 that customers (e.g., the enterprises and ISVs described above with reference to FIGS. 1-5) can use to select resources and request service deployment. The customers can also use the portal 220 and the SDK 222 to deploy SaaS and IDaaS and to setup policies described above with reference to FIGS. 1-5. The cloud controller 212 further includes a cloud resource manager 224, a compute resource provider 226, and a front-end 228. The front-end 228 interfaces with the fabric controllers 232 of one or more data centers 214. The cloud resource manager 224 receives the customer selections and forwards the customer selections to the compute resource provider 226. The compute resource provider 226 generates a tenant model based on the customer selections. The compute resource provider 226 provisions resources to the customer services according to the tenant model generated based on the customer selections. The compute resource provider 226 provisions storage, networking, and computing resources by interfacing with a cloud storage (Xstore) 230, a network resource provider 231, and the fabric controllers 232.

The ISVs can use the cloud computing system (CCS) 200 to develop and deploy the application 10 as described above with reference to FIGS. 1-5. The users of enterprises can access the application 10 hosted on the CCS 200 as described above with reference to FIGS. 1-5. The enterprises can discover and takeover (adopt) the application 10 as described above with reference to FIGS. 1-5 using the CCS 200. The CCS 200 can be implemented using the distributed network system 100 as described above with reference to FIGS. 6-8.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor; and
a tangible machine readable medium having stored thereon machine readable instructions that are structured such that, when executed by the processor, the machine readable instructions cause the system to:
receive a user registration for registering a user account for accessing a computer program, the user registration including identification information of a user, the identification information indicating that the user is associated with an enterprise;
generate a user account based on the user registration;
grant the user account access to a first set of one or more features of the computer program;
record the user registration in an application directory, the application directory being a data structure that records a plurality of user registrations;
access an organization directory, the organization directory being a data structure that contains identification information of entities within one or more enterprises;
determine that the identification information of the user corresponds to an entity of a particular enterprise contained in the organization directory;
identify a second entity contained in the organization directory to be a decision maker of the particular enterprise;
automatically notify the second entity, via a computer network, the access of the computer program by the entity within the particular enterprise;
receive an indication from the second entity, indicating that the enterprise is willing to adopt the computer program;
grant the user account access to a second set of one or more features of the computer program, the second set of one or more features including a single sign-on authentication service used by the enterprise that allows the user to access the application via the user account using single sign-on policy of the enterprise without requiring any code changes to the computer program;
generate a consent request asking whether the user agrees to allow the enterprise to access personal data created before the enterprise's adopting the computer program; and
in response to receiving a non-consent indication from the user,
create a new user account for the user, granting the new user account the first set of one or more features of the computer program; and
migrate the personal data created before the enterprise's adopting the computer program from the user account to the new user account;
receive a second indication from the second entity, indicating that the enterprise is discontinuing use of the computer program; and
in response to the second indication, grant the user access to the computer program back to the first set of one or more features, allowing the user continuing accessing at least a portion of data created before the enterprise's discontinued use of the computer program.

2. The system of claim 1 wherein the machine readable instructions are further configured to allow the computer program to identify an entity of the enterprise to indicate the use of the computer program by the one or more accounts based on identifying information provided by the one or more accounts when accessing the computer program.

3. The system of claim 1 wherein the machine readable instructions are further configured to allow the computer program to identify an entity of the enterprise to indicate the use of the computer program by the one or more accounts based on identifying information collected by an identity-as-a-service used by the computer program to identify the one or more accounts and based on data collected by the identity-as-a-service about the enterprise.

4. The system of claim 1 wherein the machine readable instructions are further configured to:
allow the one or more accounts to access the computer program, before the computer program is purchased and managed by the enterprise, based on identities of the one or more accounts associated with the enterprise; and
allow the one or more accounts to access the computer program, after the enterprise purchases and manages the computer program, based on the identities of the one or more accounts associated with the enterprise and using a single sign-on authentication service used by the enterprise.

5. The system of claim 4 wherein the machine readable instructions are further configured to allow the computer program to provide an option to the one or more accounts, after the enterprise purchases and manages the computer program, to allow the enterprise to access at least a portion of data created by the one or more accounts using the computer program before the computer program is purchased and managed by the enterprise.

6. The system of claim 4 wherein the machine readable instructions are further configured to allow the computer program to provide an option to the one or more accounts, after the enterprise purchases and manages the computer program, to create a separate account to access at least a portion of data created by the one or more accounts using the computer program before the computer program is purchased and managed by the enterprise, and to disallow the enterprise to access the portion of data.

7. The system of claim 1 wherein the machine readable instructions are further configured to:
allow the one or more accounts to access the computer program, before the computer program is purchased and managed by the enterprise, based on identities of the one or more accounts unassociated with the enterprise;
link, after the enterprise purchases and manages the computer program, the identities of the one or more accounts unassociated with the enterprise to respective identities of the one or more accounts associated with the enterprise; and
allow the one or more accounts to access the computer program, after the enterprise purchases and manages the computer program, based on the identities of the one or more accounts associated with the enterprise and using a single sign-on authentication service used by the enterprise.

8. The system of claim 7 wherein the machine readable instructions are further configured to allow the computer program to link the identities after the enterprise purchases and manages the computer program by:
allowing the one or more accounts to sign on to the computer program using the identities of the one or more accounts unassociated with the enterprise; and directing the one or more accounts to use the single sign-on service of the enterprise using the respective identities.

9. The system of claim 7 wherein the machine readable instructions are further configured to allow the computer program to provide an option to the one or more accounts, after the enterprise purchases and manages the computer program, to allow the enterprise to access at least a portion of data created by the one or more accounts using the computer program before the computer program is purchased and managed by the enterprise.

10. The system of claim 7 wherein the machine readable instructions are further configured to allow the computer program to provide an option to the one or more accounts, after the enterprise purchases and manages the computer program, to create a separate account to access at least a portion of data created by the one or more accounts using the computer program before the computer program is purchased and managed by the enterprise, and to disallow the enterprise to access the portion of data.

11. The system of claim 7 wherein the machine readable instructions are further configured to allow the computer program to provide an option to the enterprise, after the enterprise purchases and manages and then decides to discontinue using the computer program, to:
  allow an account of the enterprise to continue accessing at least a portion of data created by the account using the computer program before the enterprise decided to discontinue using the computer program;
  allow the account to create a separate account with the computer program to continue accessing the portion of data; and
  disallow the enterprise to access the separate account.

12. A method, implemented at one or more processors, comprising:
  receiving a user registration for registering a user account for accessing a computer program, the user registration including identification information of a user, the identification information indicating that the user is associated with an enterprise;
  generating a user account based on the user registration;
  granting the user account access to a first set of one or more features of the computer program;
  recording the user registration in an application directory, the application directory being a data structure that records a plurality of user registrations;
  accessing an organization directory, the organization directory being a data structure that contains identification information of entities within one or more enterprises;
  determining that the identification information of the user corresponds to an entity of a particular enterprise contained in the organization directory;
  identifying a second entity contained in the organization directory to be a decision maker of the particular enterprise;
  automatically notifying the second entity, via a computer network, the access of the computer program by the entity within the particular enterprise;
  receiving an indication from the second entity, indicating that the enterprise is willing to adopt the computer program;
  granting the user account access to a second set of one or more features of the computer program, the second set of one or more features including a single sign-on authentication service used by the particular enterprise that allows the user to access the application via the user account using single sign-on policy of the enterprise without requiring any code changes to the computer program;
  generating a consent request asking whether the user agrees to allow the enterprise to access personal data created before the enterprise's adopting the computer program; and
  in response to receiving a non-consent indication from the user,
    creating a new user account for the user, granting the new user account the first set of one or more features of the computer program; and
    migrating the personal data created before the enterprise's adopting the computer program from the user account to the new user account;
  receiving a second indication from the second entity, indicating that the enterprise is discontinuing use of the computer program; and
  in response to the second indication, granting the user access to the computer program back to the first set of one or more features, allowing the user continuing accessing at least a portion of data created before the enterprise's discontinued use of the computer program.

13. The method of claim 12 further comprising identifying, using the computer program, an entity of the enterprise to indicate the use of the computer program by the one or more accounts based on identifying information received by the computer program from the one or more accounts when accessing the computer program.

14. The method of claim 12 further comprising identifying, using the computer program, an entity of the enterprise to indicate the use of the computer program by the one or more accounts based on identifying information collected by an identity-as-a-service used by the computer program to identify the one or more accounts and based on data collected by the identity-as-a-service about the enterprise.

15. The method of claim 12 further comprising:
  allowing the one or more accounts to access the computer program before the computer program is purchased and managed by the enterprise, based on identities of the one or more accounts associated with the enterprise; and
  allowing the one or more accounts, after the enterprise purchases and manages the computer program, based on the identities of the one or more accounts associated with the enterprise and using a single sign-on authentication service used by the enterprise.

16. The method of claim 15 further comprising providing, using the computer program, after the enterprise adopts the computer program, an option to the one or more accounts to:
  allow the enterprise to access at least a portion of data created by the one or more accounts using the computer program before the computer program is purchased and managed by the enterprise; or
  create a separate account to access at least a portion of data created by the one or more accounts using the computer program before the computer program is purchased and managed by the enterprise, and disallow the enterprise to access the portion of data.

17. The method of claim 12 further comprising:
  allowing the one or more accounts to access the computer program before the computer program is purchased and managed by the enterprise, based on identities of the one or more accounts unassociated with the enterprise;
  linking, after the enterprise purchases and manages the computer program, the identities of the one or more accounts unassociated with the enterprise to respective identities of the one or more accounts associated with the enterprise; and allowing the one or more accounts to access the computer program after the enterprise purchases and manages the computer program, based on the identities of the one or more accounts associated with the enterprise and using a single sign-on authentication service used by the enterprise.

18. The method of claim 12 further comprising providing, using the computer program, an option to the enterprise, after the enterprise takes over the computer program and then decides to discontinue using the computer program, to:

allow an account of the enterprise to continue accessing at least a portion of data created by the account using the computer program before the enterprise decided to discontinue using the computer program;

allow the account to create a separate account with the computer program to continue accessing the portion of data; and disallow the enterprise to access the separate account.

19. A computer program product comprising one or more hardware storage devices having stored thereon computer-executable instructions that are structured such that, when executed by one or more processors of a computing system, the computer-executable instructions cause the computing system to:

receive a user registration for registering a user account for accessing the computer program, the user registration including identification information of a user, the identification information indicating that the user is associated with an enterprise;

generate a user account based on the user registration;

grant the user account access to a first set of one or more features of the computer program;

record the user registration in an application directory, the application directory being a data structure that records a plurality of user registrations;

access an organization directory, the organization directory being a data structure that contains identification information of entities within one or more enterprises;

determine that the identification information of the user corresponds to an entity of a particular enterprise contained in the organization directory;

identify a second entity contained in the organization directory to be a decision maker of the particular enterprise;

automatically notify the second entity, via a computer network, the access of the computer program by the entity within the particular enterprise;

receive a first indication from the second entity, indicating that the enterprise is willing to adopt the computer program;

grant the user account access to a second set of one or more features of the computer program, the second set of one or more features comprising (1) a single sign-on authentication service of the enterprise regarding use of the computer program without modifying the computer program; and (2) causing at least a portion of data created before the enterprise's adopting the computer program to be inaccessible by the enterprise;

generate a consent request asking whether the user agrees to allow the enterprise to access personal data created before the enterprise's adopting the computer program;

in response to receiving a non-consent indication from the user, create a new user account for the user, granting the new user account the first set of one or more features of the computer program; and migrate the personal data created before the enterprise's adopting the computer program from the user account to the new user account;

receive a second indication from the second entity, indicating that the enterprise is discontinuing use of the computer program; and in response to the second indication, grant the user access to the computer program back to the first set of one or more features, allowing the user continuing accessing at least a portion of data created before the enterprise's discontinued use of the computer program.

* * * * *